US011982628B2

(12) United States Patent
Hyatt et al.

(10) Patent No.: US 11,982,628 B2
(45) Date of Patent: May 14, 2024

(54) SYSTEM AND METHOD FOR DETECTING DEFECTS ON IMAGED ITEMS (71) Applicant: INSPEKTO A.M.V. LTD., Ramat Gan (IL)

(72) Inventors: Yonatan Hyatt, Tel-Aviv (IL); Gil Zohav, Beer Sheva (IL); Ran Ginsburg, Ramat Gan (IL); Dagan Eshar, Tel Aviv (IL)

(73) Assignee: INSPEKTO A.M.V. LTD., Ramat Gan (IL)

( * ) Notice: Subject to any disclaimer, the term of this patent is extended or adjusted under 35 U.S.C. 154(b) by 742 days.

(21) Appl. No.: 17/053,809

(22) PCT Filed: May 10, 2019

(86) PCT No.: PCT/IL2019/050532
§ 371 (c)(1),
(2) Date: Nov. 9, 2020

(87) PCT Pub. No.: WO2019/215746
PCT Pub. Date: Nov. 14, 2019

(65) Prior Publication Data
US 2021/0233229 A1 Jul. 29, 2021

Related U.S. Application Data (60) Provisional application No. 62/669,403, filed on May 10, 2018.

(30) Foreign Application Priority Data

May 10, 2018 (IL) .......................................... 259285

(51) Int. Cl.
G06T 7/00 (2017.01)
G01N 21/88 (2006.01)
(Continued)

(52) U.S. Cl.
CPC ....... *G01N 21/8851* (2013.01); *G06T 7/0004* (2013.01); *G06V 10/764* (2022.01);
(Continued)

(58) Field of Classification Search
CPC ....... G01N 21/8851; G01N 2203/0062; G01N 21/88; G06T 7/0004; G06T 2207/20081;
(Continued)

(56) References Cited

U.S. PATENT DOCUMENTS 7,729,528 B2    6/2010  O'Dell
9,224,070 B1   12/2015  Sundareswara
(Continued)

FOREIGN PATENT DOCUMENTS

KR    101688458 B1    12/2016

OTHER PUBLICATIONS

S. Mei, et al., "An Unsupervised-Learning-Based Approach for Automated Defect Inspection on Textured Surfaces," IEEE Transactions on Instrumentation and Measurement, Jun. 2018, p. 1266-1277, vol. 67, No. 6, IEEE, New York, USA.
(Continued)

Primary Examiner — Bobbak Safaipour
(74) Attorney, Agent, or Firm — AlphaPatent Associates Ltd.; Daniel J. Swirsky (57) ABSTRACT Embodiments of the invention provide a machine learning based detection system, in which defects can be detected even if the system was not trained for these defects and even in items that were not used to train the system, thereby offering an inherently flexible detection system.

16 Claims, 4 Drawing Sheets (51) Int. Cl.
*G06V 10/764* (2022.01)
*G06V 20/64* (2022.01)

(52) U.S. Cl.
CPC ............... *G01N 2203/0062* (2013.01); *G06T 2207/20081* (2013.01); *G06V 20/64* (2022.01)

(58) Field of Classification Search
CPC .. G06V 10/764; G06V 20/64; G06V 2201/06; G06F 18/2433; G06N 3/044; G06N 3/045; G06N 3/08
See application file for complete search history.

(56) References Cited

U.S. PATENT DOCUMENTS

| | | | |
|---|---|---|---|
| 2003/0179932 A1* | 9/2003 | Katsuyama | G09B 5/00 707/E17.02 |
| 2003/0182251 A1 | 9/2003 | Kim | |
| 2010/0215246 A1 | 8/2010 | Albeck | |
| 2012/0128230 A1 | 5/2012 | Meada | |
| 2012/0154607 A1 | 6/2012 | Moed | |
| 2012/0155741 A1 | 6/2012 | Shibuya | |
| 2015/0064813 A1 | 3/2015 | Ayotte | |
| 2015/0131116 A1 | 5/2015 | Sochi | |
| 2015/0362908 A1 | 12/2015 | Lee | |
| 2021/0012475 A1* | 1/2021 | Hyatt | G01N 21/8851 |
| 2022/0020136 A1* | 1/2022 | Hyatt | G06T 7/74 |
| 2023/0214985 A1* | 7/2023 | Li | G06N 3/09 382/141 |

OTHER PUBLICATIONS

A. Kumar, "Computer-Vision-Based Fabric Defect Detection: A Survey", IEEE Transactions on Industrial Electronics, Jan. 2008, pp. 351-358, vol. 55 No.1, IEEE, New York, USA.

Je-Kang Park, et al., "Machine Learning-Based Imaging System for Surface Defect Inspection", International Journal of Precision Engineering and Manufacturing-Green Technology, Jul. 2016, vol. 3, No. 3, pp. 303-310.

Dosovitskiy et al., "FlowNet: Learning Optical Flow with Convolutional Networks," Proceedings of the IEEE International Conference on Computer Vision (ICCV), 2015, pp. 2758-2766, IEEE, New York, USA.

Zagoruyko et al., "Learning to Compare Image Patches via Convolutional Neural Networks," 2015, IEEE Conference on Computer Vision and Pattern Recognition (CVPR), IEEE Xplore, Oct. 15, 2015, IEEE, New York, USA.

* cited by examiner

SYSTEM AND METHOD FOR DETECTING DEFECTS ON IMAGED ITEMS

FIELD

The present invention relates to use of machine learning processes, specifically in visual inspection processes, for example, inspection of items on a production line.

BACKGROUND

Inspection during production processes helps control the quality of products by identifying defects and then acting upon this detection, for example, by fixing the defect or discarding the defective part. The process of defect detection is important for quality assurance (QA) gating and sorting, and is also useful in improving productivity, reducing defect rates, and reducing re-work and waste.

Automated visual inspection methods are used in production lines to identify visually detectable anomalies that may have a functional or aesthetic impact on a manufactured part. Due to the underlying technologies that drive them, current visual inspection solutions for production lines are typically highly customized to a particular QA, gating, or sorting task.

Machine learning processes are sometimes used to identify defects in unlabeled inspected items, via image analysis. Traditional approaches that use machine learning techniques for detection of defected items usually involve two steps. First, features in images that characterize defected items are extracted and then classifiers are built based on the numerical values of the features, to assign a class code to each defect.

Typically, machine-learning predictors (and specifically convolutional neural networks) are based on models which have fixed size inputs and fixed size outputs. Examples include classification, detection and segmentation machine learning models and specifically deep learning models, which are inputted with a fixed number of images, typically one image for classification, detection and segmentation, two images for stereo correspondences, etc.

Approaches based on machine learning require a training phase and an expert defined feature set. For example, images of defected items must be collected, the defects in the images must be validated, manually annotated and possibly sorted to different defect classes, etc., all of which involve great and time-consuming efforts. Furthermore, adding new classes of defects requires additional significant effort for data collection and re-training.

Apart from the burden of creating and updating a database of defects, the imaging environment (such as, positioning of the camera, ambient lighting conditions, and the physical location and position of the imaged article) greatly affects the visual representation of imaged articles, thereby rendering these solutions often relevant only to a specific item, specific defects and to a specific imaging environment. Thus, in addition to the initial high cost of these approaches, each new manufactured article or new identified defect causes downtime that may be measured in weeks and months, between the time a project involving a new manufactured article or defect is initiated until it is deployed. In the interim period, a plant is compelled to use expensive internal/external human workforce to perform QA, gating, sorting or other tasks, or bear the risks associated with production degrade derived from not performing any of these tasks at one or more parts of the plant production lines.

These risks may have a substantial impact on a production plants' competitiveness and its ability to maintain its hard-won position within its value-chain. In some ultra-competitive industries, such as the automotive industry, a few defected articles among many hundreds of thousands non-defected ones, may lead to an immediate escalation process, jeopardizing the plant's ability to maintain its current and/or future customer base.

SUMMARY

Embodiments of the invention provide a machine learning based detection system, in which defects can be detected even if the system was not trained for these defects and even in items that were not used to train the system, thereby offering an inherently flexible detection system.

As opposed to the typical machine learning models, embodiments of the invention enable using inputs of variable sizes (e.g., a variable numbers of images), in prediction, classification, segmentation and similar machine learning based processes, to detect defects in imaged items. As further discussed below, the ability to use a variable size input to predict defects in imaged items greatly improves the ability to inspect different types of manufactured items without prior knowledge of the specific item, the defects or the imaging environment, thereby providing a flexible, simple to implement and easy to use solution for production line inspection. This ability may be especially beneficial for environments in which object appearance, object location, illumination conditions, etc., are highly variable, as further discussed below.

BRIEF DESCRIPTION OF THE FIGURES

The invention will now be described in relation to certain examples and embodiments with reference to the following illustrative figures so that it may be more fully understood. In the drawings.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

Embodiments of the invention enable prediction using inputs of variable sizes.

In one embodiment a system for obtaining a prediction for an imaged item includes a processor in communication with a camera. The processor may receive a number of images from the camera and may embed the images to produce a predetermined size representation of the images. The predetermined size representation is then used in a machine learning process to obtain a prediction regarding an imaged item.

In some embodiments, a prediction includes detection of defects on imaged items and/or performing segmentation of the defected pixels.

Defects may be detected in images obtained even by commonly used, inexpensive, cameras, thereby providing an attainable method of human-level (or better) detection of defects.

Embodiments of the invention provide machine learning based prediction of imaged items without knowledge of or prior training using the specific type of imaged item. In some embodiments a predictor is trained on images of items of a first type but can predict or classify images of items of a second type.

In one embodiment a solution for visual inspection of items on a production line is provided in which defects on imaged items are detected by inputting to a processor trained on images of items of a first type, an image of a defect free item of a second type and an image of an item of the second type of unknown class. The processor is then used to detect a defect on the item of the second type in the image of item of the second type of unknown class.

Thus, in some embodiments a predictor is trained, off-site, to detect defects on items of a certain type (for example auto engine parts). After the training phase the predictor is used on-site, typically at a manufacturing plant, to detect defects on items of a completely different type (for example different auto parts or items related to totally different industries such as sanitary products, turbines, PCB's, etc.).

In some embodiments, illustrated below, prediction may include detecting one or more defects on items on an inspection line (e.g., at a manufacturing plant). Thus, in some embodiments, prediction is used to differentiate between defect-free items and defected items.

A defect may include, for example, a visible flaw on the surface of the item, an undesirable size of the item or part of the item, an undesirable shape or color of the item or part of the item, an undesirable number of parts of the item, a wrong or missing assembly of interfaces of the item, a broken or burned part, an incorrect alignment of the item or parts of the item, a wrong or defected barcode, and in general, any difference between the defect-free sample and the inspected item, which would be evident from the images to a user, namely, a human inspector, in the production line. In some embodiments a defect may include flaws which are visible only in enlarged or high resolution images, e.g., images obtained by microscopes or other specialized cameras.

As exemplified herein, a processor may receive (from one or more cameras) image data of an item on an inspection line, during a production line inspection process.

A production line inspection process, typically occurring at a manufacturing plant, may include a set up stage prior to an inspection stage.

In the set up stage, samples of a same-type manufactured item with no defects (defect-free items) are imaged on an inspection line, the same inspection line or an inspection line having similar set up parameters to those being used for the inspection stage. Set up parameters typically relate to positioning of a camera in relation to the inspection line and may include, for example, distance of the camera from the imaged items, location of the imaged items with the camera field of view (FOV), etc.

Images obtained at the set up stage (also termed set up images or reference images) are analyzed by a processor and are then used as a reference for machine learning algorithms run at the inspection stage.

At the inspection stage, inspected items (manufactured items from the same type as the set up items, that are to be inspected for defects) are imaged and the image data collected from each inspected item (image of an item of unknown class, also termed inspection image) is run through the machine learning process, which, based on the reference of defect free items, detects one or more defects, if existing, on each inspected item.

The term "same-type items" refers to items of the same type, items which are of the same physical makeup and are similar to each other in shape and dimensions and possibly color and other physical features. Typically, items of a single production series, batch of same-type items or batch of items in the same stage in its production line may be "same-type items". For example, if the inspected items are sanitary products, sink bowls of the same batch are same-type items.

Figure 1:
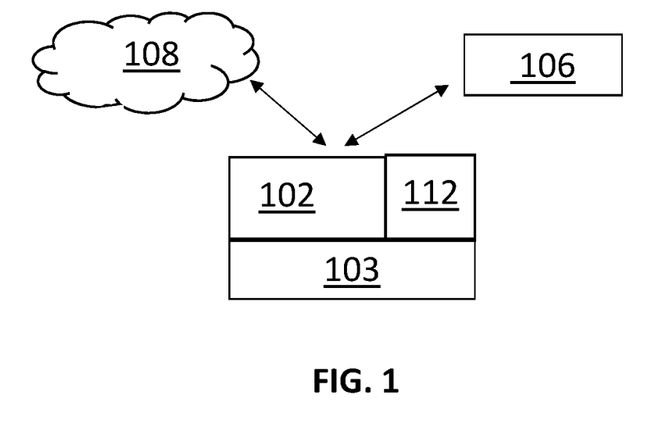
FIG. 1 schematically illustrates a system for detecting defects in imaged items, operable according to embodiments of the invention.

A system for visual inspection of a production line, according to one example of the invention, is schematically illustrated in FIG. 1.

In one embodiment, an inspection line system includes a processor 102 in communication with one or more camera(s) 103 and with a device, such as a user interface device 106 and/or other devices, such as remote device 108. Camera(s) 103 are typically placed or positioned in relation to an inspection line (e.g., a conveyer belt), such that items placed on the inspection line are within the FOV of the camera 103.

Processor 102 receives image data of the inspection line from the one or more camera(s) 103 and runs processes according to embodiments of the invention to analyze the image data and to output a signal to control the user interface device 106 and/or other devices such as, remote device 108, which may be connected to the system via the cloud.

In the context of this description, image data may include data such as pixel values that represent the intensity of reflected light as well partial or full images or videos.

The user interface device 106 may include a monitor or screen displaying instructions and/or notifications to a user (e.g., text or other content displayed on the monitor). In another example, the user interface device 106 may include a light that may light up or change color based on the signal generated by processor 102. In yet another example, the user interface device 106 includes an audio player to emit a sound based on the signal generated by processor 102. In other embodiments user interface device 106 may include other suitable media by which to communicate with a user.

In some embodiments user interface device 106 may be part of a multi purpose device such as a smart-phone, tablet or personal computer.

In some embodiments processor 102 can accept user input, e.g., via user interface device 106. For example, user interface device 106 may include a monitor and keyboard and/or mouse and/or touch screen, to enable a user to input additional feedback. For example, if during the inspection stage an item in an inspection image is erroneously detected by processor 102 as defected, a user may provide feedback (e.g., via user interface device 106) that the inspection image is of a defect-free item and not a defective item. In other examples, a user may provide feedback that an item classified as defect free is in fact a defective item. In these cases, based on the user input, processor 102 may use this feedback to update and improve the reference set, used by and for the machine learning process as described below.

Processor 102 may include, for example, one or more processors and may be a central processing unit (CPU), a graphics processing unit (GPU), a digital signal processor (DSP), a microprocessor, a controller, a chip, a microchip, an integrated circuit (IC), or any other suitable multi-purpose or specific processor or controller.

Processor 102 is typically in communication with a memory unit 112. In one embodiment the memory unit 112 stores executable instructions that, when executed by the processor 102, facilitate performance of operations of the processor 102, as described below. Memory unit 112 may also store at least part of the image data received from camera(s) 103.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In the set up stage, reference images are collected so as to obtain a set of images that represent all the information needed for the machine learning process to detect as defects only defects and not, for example, detect variations due to the imaging environment, as defects. The number of set up images required to achieve a representative reference that can be used by the machine learning process at the inspection stage, varies according to different features of the item being inspected and properties of the production line of the item. For example, items having high variability in their appearance (e.g., objects which have high shape tolerance in the manufacturing process, high textural variance on the surface of the object as an outcome of the manufacturing process, etc.) may not be well represented by a single image. Thus, several images may be required, as well as a different number of images for different items, to capture a representing variant of the item.

In some embodiments, analyzing images to determine that a variant fully representing a defect free item is obtained, may include analyzing information regarding the 2D and 3D shapes of the defect free item.

To list some examples:
Items that are allowed to be placed in different and apart locations on the production line will require reference images at a variety of locations.
Items whose surface has 3D properties (different heights on the item's surface) may require denser distribution of reference images than an item that has a shallower face of surface, in order to achieve a fully representing reference.
Items that can rotate or have rotating parts may require reference images covering the rotations.
Some items can have shape tolerance which needs to be represented by reference images covering the range of allowed tolerance.
In some cases, highly isometric or highly texturized items may require many reference images to obtain a good representation of the compositional properties of the items.

Thus, using a fixed, a priori determined, number of set up images, while disregarding the differing features of the item being inspected and the properties of the production line of the item, may result in a waste of time and effort. For example, a fixed number of set up images may result in a case where the fixed number of images can produce a representative reference of a first item but is unnecessarily high for producing a representative reference for a different item. In another case, the fixed number may be enough to produce a representative reference for a first item but is not enough to produce a representative reference for a different item.

Thus, according to an embodiment of the invention, an undetermined number of images is typically used in the set up stage. Namely, the number of set up images is not determined in advance and may be different for each item and/or manufacturing plant and/or imaging environment.

In order to enable a defined and unvarying reference to be used by the machine learning process, even though a varying number of set up images are collected for reference, embodiments of the invention calculate or embed a predetermined sized representation from the varying number of set up images and use this representation as input to the machine learning process, to predict defects at the inspection stage.

In order to calculate a vector (or other representation) of a predetermined size from a varying number of set up images, the processor 102, in one embodiment, compares the received set up images to each other. In one embodiment the set up images are compared to extract attributes from the images and using the attributes to produce the predetermined size representation. The attributes may be extracted from the images based on similarity of the attributes between images.

In other embodiments the vector (or other representation) of a predetermined size is calculated from the varying number of set up images using machine learning techniques.

Processor 102 receives (from one or more cameras 103) a number of images, which may be different for different instances. An instance may mean e.g., inspection instances or specific sessions in which, for example, an item in a specific location and viewpoint, at a specific stage of its production, is being inspected.

The number of images received at processor 102 includes at least one image of a defect-free item from which a predetermined size representation is calculated. The predetermined size representation is then used by a machine learning predictor to obtain a prediction regarding an item of unknown class (e.g., either defect-free or defective items). In some embodiments the number images received at processor 102 includes at least one image of a defect-free item and an image of an item of unknown class and a predetermined size representation is calculated from both. The predetermined size representation is then used by a machine learning predictor to obtain a prediction regarding the item of unknown class.

In one embodiment, the processor 102 calculates a predetermined sized representation by analyzing, in each instance, the received images (which may include reference images and an inspection image) (e.g., by running convolutional neural networks in a Siamese network topology on each image separately or, for example, on a result of subtraction of reference images with respect to the inspection image) to find similarities or other relationships between the different images, or to analyze for attributes affecting the images (e.g., lighting conditions), resulting in a varying sized set of attributes (which may include features of an item and/or or properties of images of items). The processor calculates (e.g., by running a recurrent neural network or other type of non-fixed input size encoder) a fixed-size representation (e.g., a vector). For example, the fixed-size representation may include a predetermined number of attributes, from the varying number of attributes. This fixed-size representation can then be used in a machine learning process to provide a prediction (e.g., to detect defects on imaged items, perform segmentation of the defected pixels, etc.).

In another embodiment, properties of images, such as inter-image statistical properties of pixels (e.g., mean values of pixels and/or standard values of pixels, motion-vectors setting the differences between images, correlations between the images, etc.), can be extracted from a set of reference images. The extracted properties may be combined to achieve a vector or other representation, which is of a predetermined size and which adequately represents the set up images, so that it may be used as input to further machine learning processes, e.g., processes during training of an embedding processor (described below) and processes during the inspection stage.

A combination of properties may include, for example, taking only the top K elements of the extracted properties or bottom K elements, or both. Other examples are detailed below.

Thus, set up images are analyzed to detect, for example, similar properties, uniquely discriminative properties, distances of properties from each other, etc. If, for example, there are two similar images with respect to a specific property, then one image may not necessarily add information (over the other image) regarding the item. In this case, image data of one of the similar images can be deleted or disregarded, thereby reducing the size of the representation of the image data, if necessary, to achieve the predetermined size representation.

As described above, in some embodiments, processor 102 controls the user interface device 106, based on results of the prediction. For example, processor 102 can control the user interface device 106 to display indication of a defective item. In other embodiments other devices, e.g., remote device 108, which may include, for example, signal processing systems, may be controlled based on results of the defect detection.

In one example, a signal processing system in communication with processor 102, may run protocols enabling transfer of, e.g., meta data between related machines. For example, related machines may include machines controlling the production line and/or the camera 103 and/or the user interface 106. Thus, for example, location or positioning of the camera 103 or, for example, operation of the conveyor belt of the production line may be controlled based on output from processor 102.

In another case, output from processor 102 may be used to control the process of defect detection. For example, the type of detected defect and/or its location on the item may be used as feedback to processor 102 (or to another processor) and may change future detection of defects.

The one or more camera(s) 103, may include a CCD or CMOS or another appropriate chip. The camera 103 may be a 2D or 3D camera. In some embodiments the camera 103 may include a standard camera provided, for example, with mobile devices such as smart-phones or tablets. In other embodiments the camera 103 is a specialized camera for obtaining high resolution images.

In some embodiments camera(s) 103 and/or processor 102 are part of an embedded system which may be a dedicated system or an already existing system in a production plant.

In some embodiments image data from the camera 103 may be uploaded to remote device 108 which may be, for example, a server on the cloud or a server or central controller at the manufacturing plant.

Processes and calculations according to embodiments of the invention may occur at a remote device and/or locally.

All or some of the components of the system described in FIG. 1 may be connected by wired or wireless methods, for example, over the internet or other suitable communications network. Some components, e.g., camera 103, may include a suitable network hub.

Figure 2:
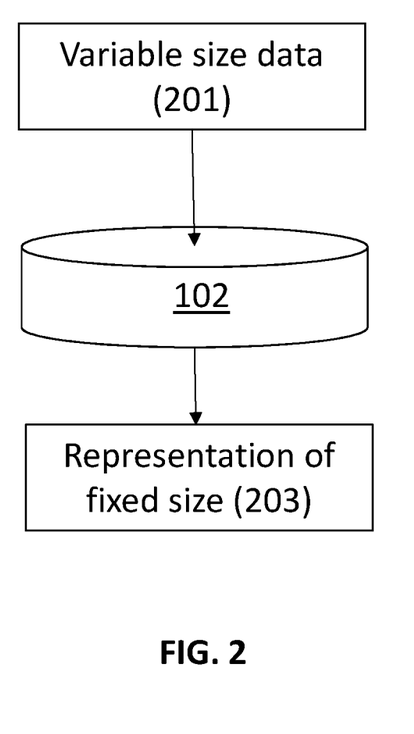
FIG. 2 schematically illustrates a method for obtaining predictions from a variable size data input, according to embodiments of the invention.

In one embodiment, which is schematically illustrated in FIG. 2, a method for prediction (e.g., detecting defects on imaged items) according to an embodiment of the invention, includes receiving (e.g., at processor 102) variable size data (201) and embedding the data to produce a fixed size representation of the data (203).

In one embodiment the method illustrated in FIG. 2 can be used to calculate a fixed size representation of data to be used as input to machine learning prediction architectures, e.g., for detecting defects on imaged items, for sorting, for gating and/or for other inspection tasks.

The method illustrated in FIG. 2 may occur at an inspection line as part of an inspection process which includes a set up stage and inspection stage, as described above.

In the set up stage the set up images are analyzed to determine when enough set up images have been collected to achieve a representative reference that can be used by the machine learning process at the inspection stage.

"Enough set up images" are collected when an essentially complete representation of a type of item is achieved. For example, analysis of the set up images may be performed to collect information regarding possible 2D shapes and 3D characteristics (e.g., rotations on the inspection line) of an item or to find uniquely discriminative features of the item and the spatial relation between these unique features, as preserved between the set up images.

Based on the information collected from set up images a processor (e.g., processor 102) can detect a second item of the same type even if the second item was not previously learned by the processor. This allows the processor to detect when a new item (of the same type) is imaged, and then to analyze the new item, for example, to determine if it is in an allowed location and search for a defect on an inspected item, based on analysis of set up items.

In one example, the step of embedding (203) may include running convolutional neural networks on each image separately in a Siamese network topology to extract from each of the images the most useful properties (typically these will include among others properties that add the most information about the item's shape, outline, surface, etc.). The most useful properties may also be extracted by a different machine learning process.

The step of embedding may further include running a recurrent neural network or other encoder architecture on the images to select or combine images based on the extracted properties, to obtain a pre-determined size vector.

In some embodiments, a fixed representation can be calculated without using an embedding processor. For example, a heuristic algorithm may be run to determine which properties to extract and/or which features to compare to determine the most and/or least correlating properties or features, which may then be used to calculate a fixed size representation.

In some embodiments a fixed size representation can be calculated based on predetermined rules, for example, based on spatial locations of features, e.g., distances (2D and/or 3D distances) of features of the item in the reference images from each other and/or relative to the inspection image.

The variable size data received in step 201 may include a number of images. In one embodiment at least one image of a defect-free item is included in the number of images. The fixed, predetermined, size representation is calculated using the one or more images of a defect-free item and the predetermined size representation is input to a machine learning predictor together with image data of an item of unknown class, to obtain a prediction regarding the unknown class item.

Figure 3:
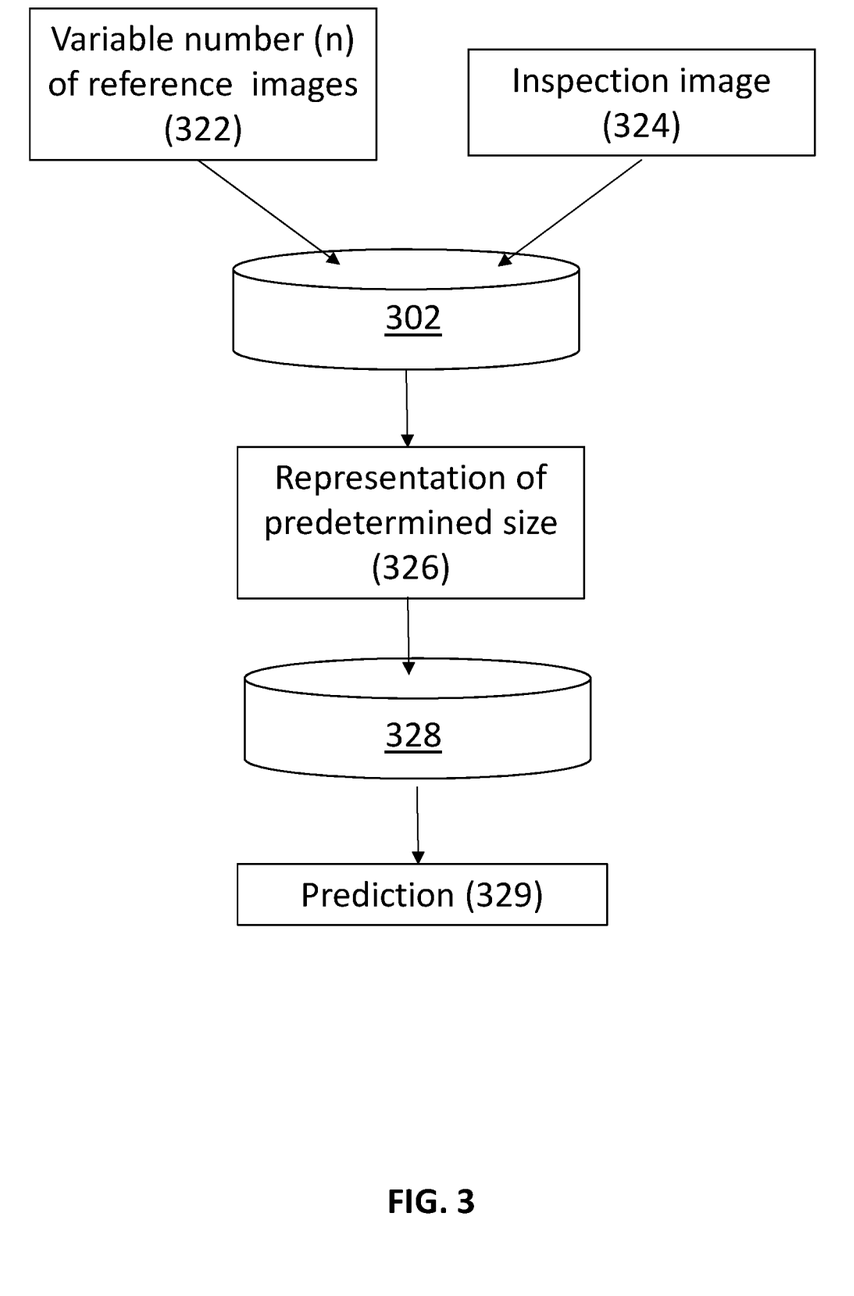
FIG. 3 schematically illustrates a method for providing predictions of defected items in a production line, according to an embodiment of the invention.

In one embodiment, which is schematically illustrated in FIG. 3, the number of images includes at least one image of a defect-free item and an image of an item of unknown class.

Processor 302 (such as an embedding processor described above) receives an undetermined number (n) of set up images 322, namely images of same type items of a known class (e.g., defect-free items) and an inspection image 324, namely, an image of a same-type item of unknown class (e.g., either defect-free or defective item). Processor 302 then analyses the received images and calculates from the received images of same type defect-free items and the image of the same-type item of unknown class, a representation of a predetermined size 326 and inputs the representation to a predictor 328 to achieve prediction 329, e.g., defect detection in inspection images.

In some embodiments the analysis performed at processor 302 includes extracting at least one attribute (e.g., property) from each of then images 322 and from the inspection image 324 and comparing the extracted properties. In one embodiment extracting attributes from the images is based on similarity of the attributes between images.

Typically, same properties or attributes are compared. For example, a specific statistical property of pixels from one image is compared to that specific statistical property of pixels from another image. For example, for each pixel in the inspection image a single most similar pixel from the reference images and/or a single most non-similar pixel from the reference images can be selected.

The vector of predetermined size may then be input to a machine learning process to enable making predictions about same-type items of an unknown class (e.g., either defected or defect-free).

In some embodiments, following the step of inputting the fixed size representation to a predictor to obtain prediction for same-type items of an unknown class, a device may be controlled based on the obtained prediction. For example, the controlled device may be remote device 108 and/or the user interface device 106, e.g., as described above.

Figure 4:
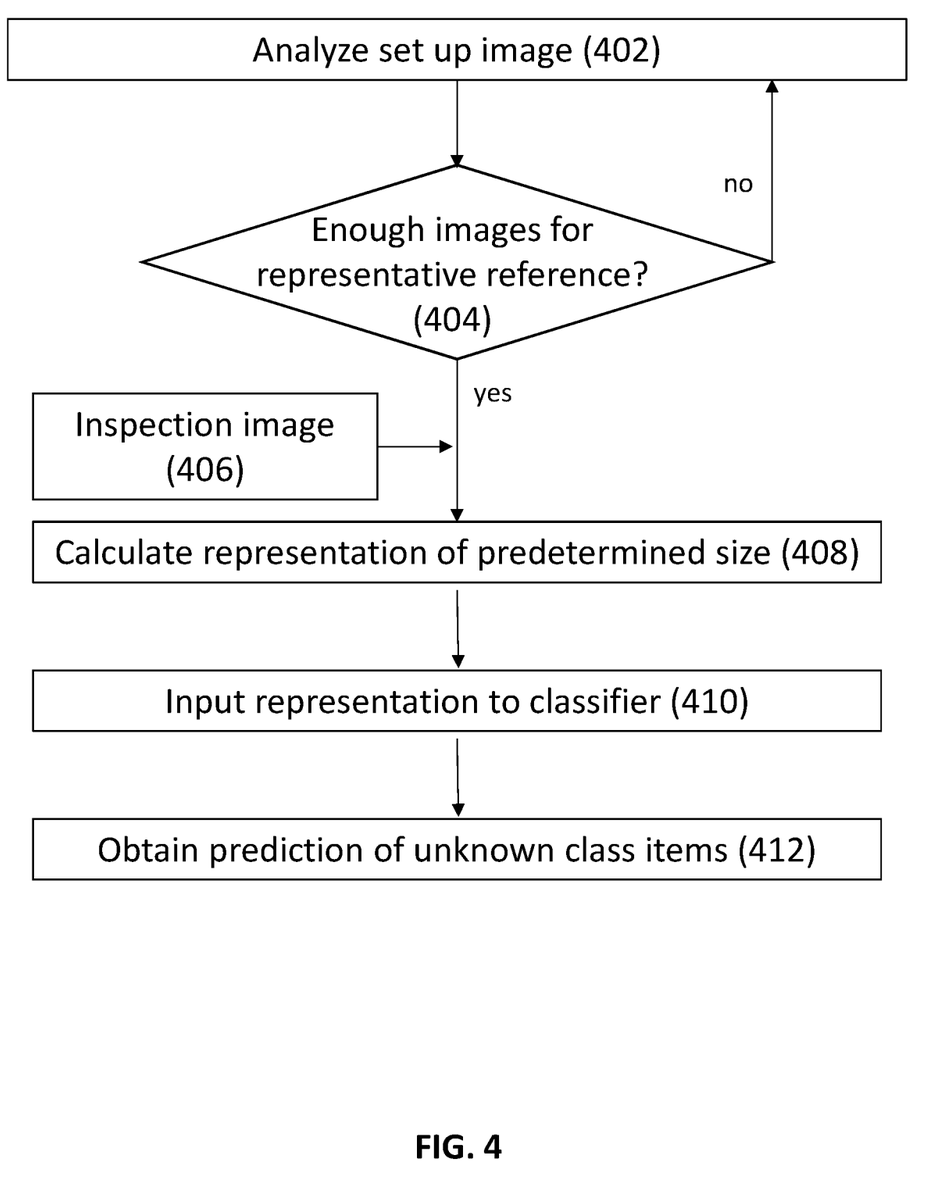
FIG. 4 schematically illustrates a method for providing predictions of defected items in a production line, according to another embodiment of the invention.

In one embodiment, which is schematically illustrated in FIG. 4, the fixed, predetermined, size representation is calculated from images of defect free items after determining that a number of defect free images that fully represent the defect free item, were received.

A method for providing prediction of defective items in a production line may include receiving a set up image (402) and determining that a number of set up images that fully represent the defect free item, were received (404). If not enough set up images were received (404), another set up image is received for further analysis. A variable number of set up images is thus obtained.

Determining that a number of defect free images that fully represent the defect free item, were received, may include analyzing information regarding the 2D and 3D shapes of the defect free item, as detailed above.

If analysis of the set up images (e.g., as described above) determines that enough set up images have been received (404), then an inspection image (image of a same-type item of an unknown class, e.g., defect-free or defective) is added (406) and a vector (or other representation) of a predetermined size is calculated from the image data of the set up images and the inspection image (408). For example, the images are embedded to produce a predetermined size representation, as described above.

The vector of predetermined size is input to a predictor (410) to obtain prediction of unknown class items (412), namely to detect defects from the inspection image.

This and other embodiments enable adaptation of the prediction process per inspection image, thereby providing an accurate and flexible prediction system.

In some embodiments a signal to control a device may be generated based on the obtained prediction. For example, the device may include user interface device 106 and processor 102 can control the user interface device 106 to display indication of a defective item based on the prediction. In another example, the device may be remote device 108, which may include a signal processing system or a controller to control operation of an inspection line system, e.g., to control operation of a conveyer belt or camera or other elements of the inspection line. Other devices may be controlled by processor 102 based on the prediction.

In some embodiments, a set up image may be received (402) based on input from a user and not necessarily during the set up stage. For example, a user may detect, during the inspection stage, that a defect-free item has (erroneously) been detected as defected or vice versa. The user may input the image of the mistakenly detected item as a "new set up image" or "defect image" (e.g., via user interface 106, as described above), thereby adding new information to the analysis of set up images.

Inspection systems according to embodiments of the invention include predictors that can detect defects in images obtained in changing imaging environments and on items that are not the same and not even similar to items upon which these predictors were trained.

In one embodiment a method for detecting defects on imaged items includes inputting to a processor trained on images of items of a first type, an image of a defect free item of a second type and an image of an item of the second type of unknown class, and using the processor to detect a defect on the item of the second type, from its image.

In some embodiments a device may be controlled based on detection of a defect on the item of the second type.

A defect, (e.g., on the item of the second type and of unknown class) may include, for example, one or more of: a visible flaw on the surface of the item, an undesirable size of the item or part of the item, an undesirable shape or color of the item or part of the item, an undesirable number of parts of the item, a wrong or missing assembly of interfaces of the item and an incorrect alignment of the item or parts of the item, a wrong or defected barcode and more.

Figure 5:
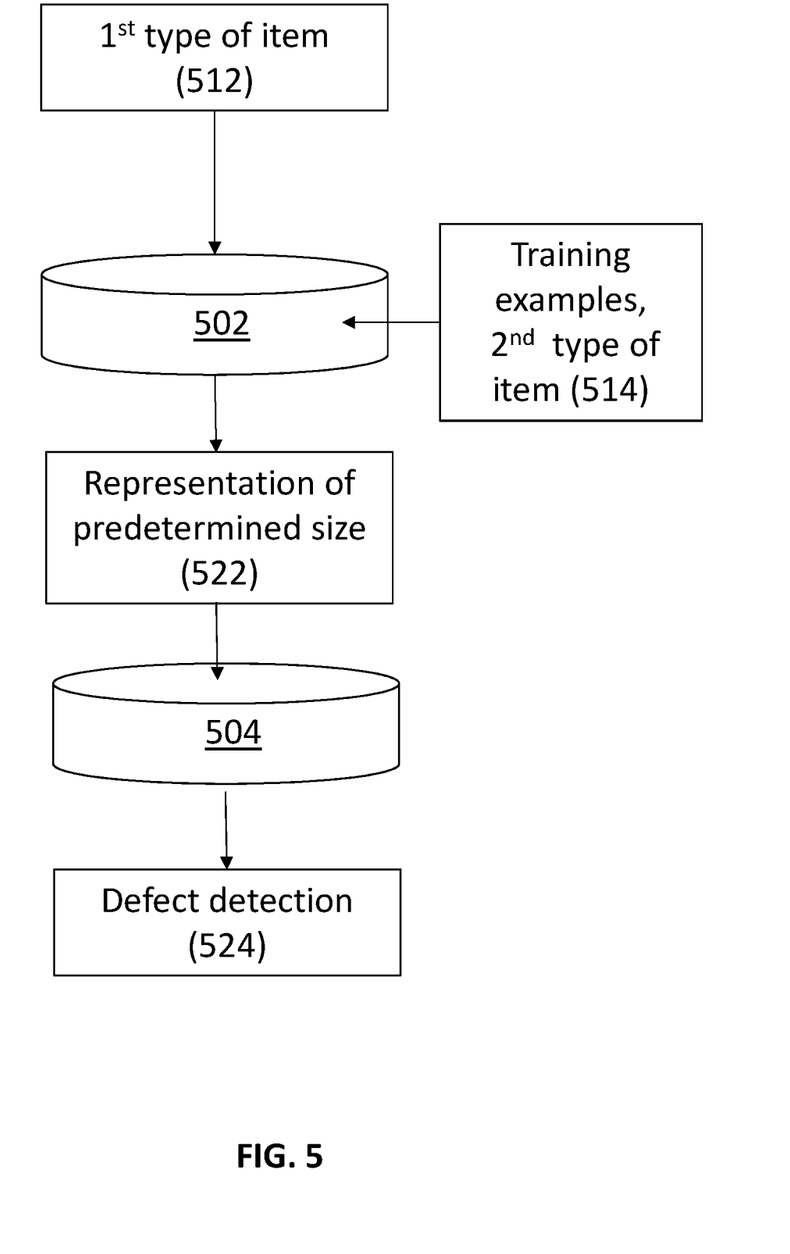
FIG. 5 schematically illustrates a method for machine learning based production line inspection, according to an embodiment of the invention.

A method for machine learning based production line inspection according to an embodiment of the invention, is schematically illustrated in FIG. 5.

Images of items of a first, certain, type (512) (for example, sanitary products) are input to a processor (502) which has been trained on images of items of second, different, types (514) (for example, turbines, engine parts and candy boxes). The processor 502 extracts properties and/or features from the images of the first type based on the training and uses the extracted properties and/or features to create a vector of a predetermined size (522). Typically, the vector represents information about the imaged items (e.g., their spatial and shape tolerance) and/or about the imaging environment. The vector is then used as input to a predictor (504) to detect defects in new images of items of the first type (524).

The processor 502 may be pre-trained on many types of physical items, to allow it to learn the behavior of many types of physical items in different imaging conditions (e.g., illumination strength, illumination direction, illumination color, dusty environment, etc.) and different spatial and environmental conditions (e.g., movement of items, 'vibrations' of the inspection line, positioning of items) and different shape conditions of the item, as may be on the inspection line.

In other embodiments processor 502 can extract the properties and/or features to create a vector of predetermined size by using a heuristic algorithm and not necessarily by prior training.

Thus, a processor (e.g., processor 502) trained on items of a first type, is used to produce a predetermined size representation from an image of a defect free item of a second type and (optionally) from an image of an item of the second type of unknown class. The predetermined size representation is then input to a machine learning predictor to detect a defect on the item of the second type in the image of item of the second type of unknown class.

Known neural networks are typically trained by example inputs (e.g., images) however, once the neural network is trained and programmed into a system for predicting unknown inputs, it will typically not use any of the later input for further training, but rather will provide a prediction for each new input. Embodiments of the invention, on the other hand, provide a machine learning process, which, even after being programmed into a processor, uses new example inputs (e.g., images of defect-free items) together with unknown inputs (e.g., images of items of an unknown status) to provide prediction for the unknown inputs, thereby improving the function of known learning machines and providing a new machine learning process.

This and other embodiments of the invention provide an improved function of a machine learning based system which enables a processor as of yet new capabilities of making predictions about items without prior training on the items and imaging environment.

Embodiments of the invention enable setting up a machine learning based inspection system at a manufacturing plant, regardless of the items being manufactured and inspected at the plant and without being limited to any specific imaging environment. Thus, systems and methods according to embodiments of the invention can be used to inspect different types of manufactured items and different defects without prior knowledge of the specific item, the defects or the imaging environment.

The invention claimed is:

1. A method for obtaining a prediction for an imaged item, the method comprising:
receiving a variable number of images of a same-type item of a known class and an image of the same-type item of an unknown class;
calculating a predetermined size representation of the received images by comparing the received images to extract attributes from the received images, and using the attributes to produce the predetermined size representation;
inputting the predetermined size representation to a machine learning predictor to obtain a prediction regarding the item of the unknown class; and
controlling a device based on the prediction.

2. The method of claim 1 wherein the prediction comprises detecting a defect on the item of the unknown class.

3. The method of claim 1 wherein the item of known class comprises a defect-free item.

4. The method of claim 3 comprising:
determining that a number of images that fully represent the defect-free item, were received prior to calculating the predetermined size representation.

5. The method of claim 4 wherein determining that a number of images that fully represent the defect-free item, were received, comprises analyzing information regarding 2D and 3D shape of the defect-free item.

6. The method of claim 4 comprising:
determining that a number of images of a defect-free item that fully represent the defect free item, were received;
adding the image of the item of unknown class; and
calculating the predetermined size representation by using the images of the defect-free item and the image of the unknown class.

7. The method of claim 1 comprising extracting attributes from the images based on similarity of the attributes between images.

8. The method of claim 1 wherein the calculating comprises using machine learning techniques.

9. The method of claim 1 wherein the variable number of images of a same-type item of a known class, comprises several images.

10. The method of claim 1 wherein the machine learning predictor is trained on images of items of a first type, and wherein the item of known class and the item of unknown class are of a second type which is different than the first type.

11. A system for visual inspection of a production line, the system comprising:
a processor in communication with a camera, the processor to:
receive a variable number of images of a same-type item of a known class and an image of an item of an unknown class;
calculate a predetermined size representation of the received images by comparing the received images to extract attributes from the received images, and using the attributes to produce the predetermined size representation; and
use the predetermined size representation in a machine learning process to obtain a prediction regarding the item of unknown class.

12. The system of claim 11 comprising controlling, based on the prediction, a signal processing system to control the production line.

13. The system of claim 11 wherein the prediction comprises detecting a defect on the item of unknown class.

14. The system of claim 11 wherein the same-type item of a known class comprises a defect-free item.

15. The system of claim 14 wherein the processor is to determine that a number of images that fully represent the defect-free item, were received prior to calculating the predetermined size representation.

16. The system of claim 11 wherein the machine learning process was trained on images of items of a first type, and wherein the item of known class and the item of unknown class are of a second type which is different than the first type.

\* \* \* \* \*